(12) United States Patent
Rotte et al.

(10) Patent No.: US 10,687,006 B2
(45) Date of Patent: Jun. 16, 2020

(54) PHOTODIODE LIMITER

(71) Applicant: GVBB HOLDINGS S.A.R.L., Luxembourg (LU)

(72) Inventors: Jeroen Rotte, Breda (NL); Peter Centen, Goirle (NL)

(73) Assignee: GVBB HOLDINGS S.A.R.L., Luxembourg (LU)

(*) Notice: Subject to any disclaimer, the term of this patent is extended or adjusted under 35 U.S.C. 154(b) by 301 days.

(21) Appl. No.: 15/483,259

(22) Filed: Apr. 10, 2017

(65) Prior Publication Data

US 2017/0214874 A1    Jul. 27, 2017

Related U.S. Application Data

(63) Continuation of application No. 14/102,463, filed on Dec. 10, 2013, now Pat. No. 9,654,710.

(51) Int. Cl.
| | |
|---|---|
| *H04N 5/353* | (2011.01) |
| *H04N 5/369* | (2011.01) |
| *H04N 5/374* | (2011.01) |
| *H04N 5/378* | (2011.01) |
| *H04N 5/359* | (2011.01) |
| *H04N 5/3745* | (2011.01) |

(52) U.S. Cl.
CPC .......... *H04N 5/3698* (2013.01); *H04N 5/353* (2013.01); *H04N 5/3594* (2013.01); *H04N 5/378* (2013.01); *H04N 5/3742* (2013.01); *H04N 5/3745* (2013.01)

(58) Field of Classification Search
CPC ........ H04N 5/335; H04N 5/343; H04N 5/359; H04N 5/3742; H01L 27/14609; H01L 27/14612

USPC .......... 250/208.1, 214 R; 348/297, 302, 304
See application file for complete search history.

(56) References Cited

U.S. PATENT DOCUMENTS

| | | | |
|---|---|---|---|
| 6,246,043 | B1 | 6/2001 | Merrill |
| 8,184,188 | B2 | 5/2012 | Yaghmai |
| 2004/0032518 | A1 | 2/2004 | Benjamin et al. |
| 2004/0096124 | A1 | 5/2004 | Nakamura |
| 2005/0057680 | A1 | 3/2005 | Agan |

(Continued)

FOREIGN PATENT DOCUMENTS

| | | |
|---|---|---|
| CN | 1708976 A | 12/2005 |
| CN | 102523391 A | 6/2012 |

(Continued)

OTHER PUBLICATIONS

First Office Action & Search Report dated Jul. 30, 2018, regarding CN Patent Application No. 201480067498.1.

(Continued)

*Primary Examiner* — Kevin K Pyo
(74) *Attorney, Agent, or Firm* — Arent Fox LLP

(57) ABSTRACT

An image sensor is provided. In one aspect, the image sensor includes a pixel coupled to an output line. The pixel includes a photodiode configured to generate electrical charges in response to light and a supply circuit configured to supply a voltage to the photodiode to keep a voltage of the photodiode at or above a threshold level in an integration time. In another aspect, the pixel includes a supply circuit configured to selectively supply voltage to the photodiode in a first charge holding capacity and a second charge holding capacity.

22 Claims, 6 Drawing Sheets

(56) References Cited

U.S. PATENT DOCUMENTS

| | | |
|---|---|---|
| 2005/0167571 A1 | 8/2005 | Altice et al. |
| 2006/0012697 A1 | 1/2006 | Boemler |
| 2010/0321532 A1 | 12/2010 | Hashimoto et al. |
| 2013/0215306 A1 | 8/2013 | Yamashita et al. |
| 2015/0200229 A1* | 7/2015 | Rotte ............... H01L 27/14812 |
| | | 250/208.1 |

FOREIGN PATENT DOCUMENTS

| | | |
|---|---|---|
| JP | H10248035 A | 9/1998 |
| JP | 2001345440 A | 12/2001 |
| JP | 2003046113 A | 2/2003 |
| JP | 2014060519 A | 4/2014 |

OTHER PUBLICATIONS

Communication Pursuant to Article 94(3) EPC dated Jul. 20, 2017, regarding EP Patent Application No. 14816185.4.

International Search Report and Written Opinion dated Feb. 5, 2015, regarding PCT/EP2014/077292.

Notice of Reasons for Rejection dated Oct. 23 2018, regarding JP Patent Application No. 2016-536756.

Notice of Reasons for Rejection dated Jun. 25, 2019, regarding JP Patent Application No. 2016-536756.

Second Office Action & Search Report dated Jun. 6, 2019, regarding CN Patent Application No. 201480067498.1.

Third Office Action dated Nov. 14, 2019, regarding CN Patent Application No. 201480067498.1.

* cited by examiner

PHOTODIODE LIMITER

CROSS REFERENCE TO RELATED APPLICATIONS

The current application is a continuation application of U.S. application Ser. No. 14/102,463, filed Dec. 10, 2013, entitled "Photodiode Limiter", the entire contents of which are hereby incorporated by reference.

BACKGROUND

Field

The present disclosure relates generally to an image sensor, and more particularly, to an image sensor with electronic shutter and a limiter.

Background

In recent years, CMOS image sensor (CIS) technology is gaining in popularity over charged coupled device (CCD). Starting with mobile devices, CIS offers lower cost because it can be manufactured using a standard CMOS process. CCD requires a specialized process. Moreover, CIS allows for more function integration, due to the use of the standard CMOS process. For example, each CIS pixel includes a buffer, which may improve the performance of the CIS over the CCD. Recently, CIS is starting to be adopted for broadcasting systems.

CIS is an example of active matrix sensor. In a pixel of a CIS, a photodiode generates electrical charges. An example of the photodiode is a p-n junction diode. In one implementation, the photodiode generates hole-electron pairs. The electrons are accumulated or integrated in the p-diffusion region of the photodiode. After an integration period, the charges accumulated are transferred to a floating diffusion via a transfer gate. In other words, the floating diffusion (C) generates a voltage (dV) from the accumulated charges (dQ) or dV=dQ/C and is coupled to the output line. In one aspect, the floating diffusion functions as a storage element. The voltage on the floating diffusion is coupled to an output line via a buffer.

In another aspect, the CIS includes an array (rows and columns) of the described pixels. In one implementation, the output lines may function as the column lines of the array. The pixels are coupled to the output lines by the rows sequentially. An output circuit coupled to the output lines performs further determining functions. For example, the output circuit may include an integrator that integrates the voltage of an output line, an operational amplifier, or an analog-to-digital converter that convert the integrated voltage to a digital value.

In another aspect, the CIS may include electronic shutter function. In one example, the shutter resets the charge integration in a group of pixels. An example is a global shutter which resets all the pixels in the CIS. The examples given are based on using the electrons to generate the wanted signal. The holes are drained off in this case. The mechanism works equally well for holes except that voltage changes reverses. Now the holes generate the wanted signal and the electrons are drained off.

SUMMARY

In an aspect of the disclosure, an image sensor and a method for the image sensor are provided. The image sensor includes a pixel coupled to an output line. The pixel includes a photodiode configured to generate electrical charges in response to light. A supply circuit configured to selectively supply voltage to the photodiode in a first charge holding capacity and a second charge holding capacity.

In another aspect, the image sensor includes a pixel coupled to an output line. The pixel includes a photodiode configured to generate electrical charges in response to light. A supply circuit configured to supply voltage to the photodiode to keep a voltage of the photodiode at or above a threshold level in an integration time.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of the image sensor will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Figure 1:
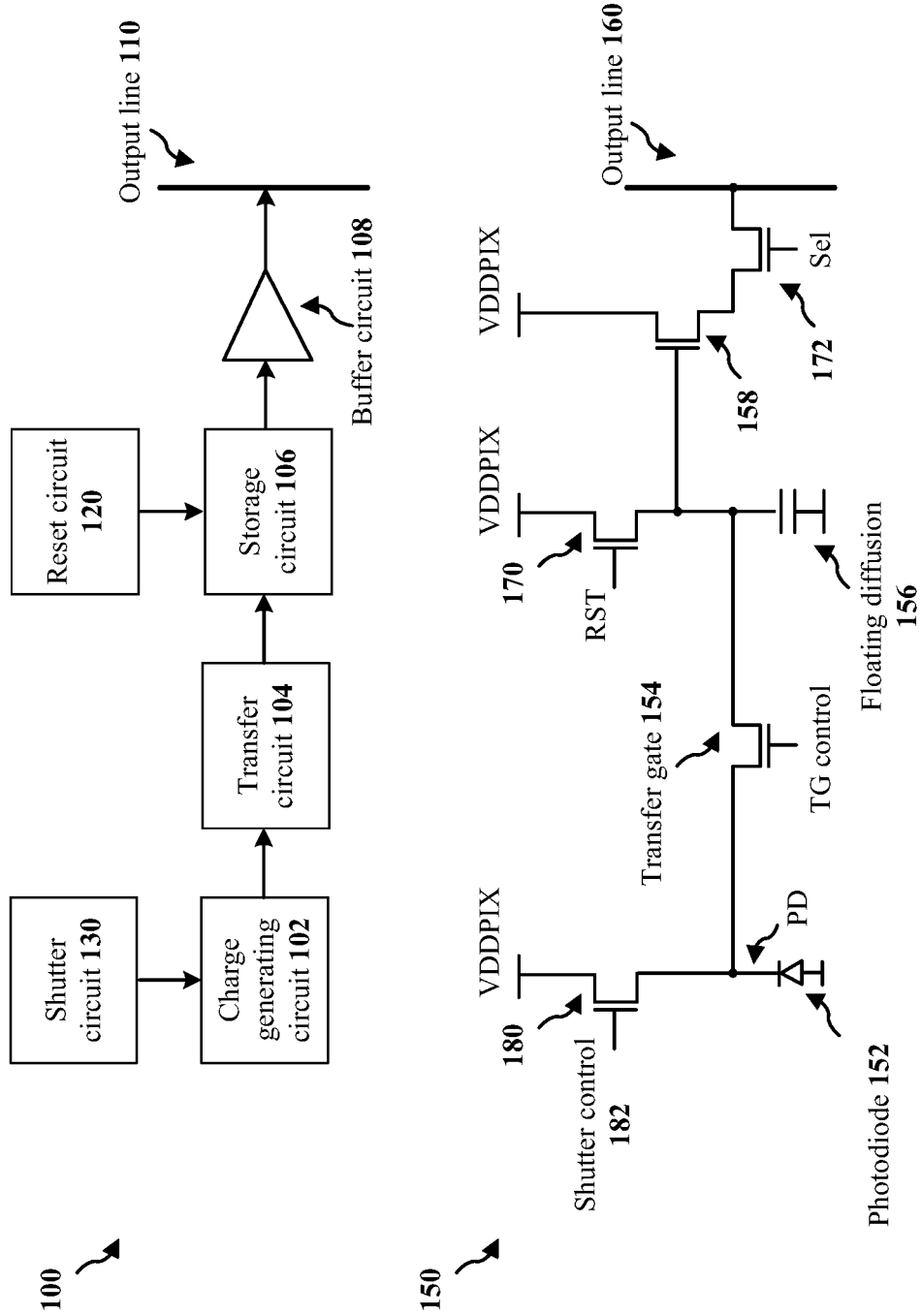
FIG. 1 is a diagram illustrating a pixel with electronic shutter.

FIG. 1 is a diagram illustrating a pixel 100 with electronic shutter. In one implementation, a charge generating circuit 102 may generate electrical charges (e.g., electrons) in response to light. The electrical charges may be accumulated or integrated in an integration period. As an example, for a 50 Hz image sensor, the integration period may be 20 ms. After the integration period, the charges accumulated may be transferred to a storage circuit 106 via a transfer circuit 104. In one aspect, the accumulated charges at the charge generating circuit 102 may be transferred to the storage circuit 106. The charge is converted into a voltage in storage circuit 106. The voltage on the storage circuit 106 may be coupled to an output line 110 via a buffer circuit 108. The reset circuit 120 may reset the voltage on the storage circuit 106.

In one implementation, a shutter circuit 130 may perform the shutter function by, e.g., controlling the integration time of the pixel 100. In one example, the integration time may be controlled by the shutter circuit 130 resetting the charge generating circuit 102 according to a predetermined timing.

Such predetermined timing may correspond to the integration time. In one example, the shutter circuit 130 may be part of a global shutter function. I.e., all pixels in an array may be controlled by the same shutter timing.

Pixel 150 is another view of the pixel with electronic shutter. In one implementation, a photodiode 152 may generate electrical charges (e.g., electrons) in response to light. In one example, the photodiode 152 may be a pinned photodiode completely depleted and pinned to a voltage potential (known as $V_{pin}$) before any charges are generated. The electrical charges may be accumulated or integrated at node PD (which may be, e.g., a node in the photodiode 152) in an integration period. After the integration period, the charges accumulated at node PD may be transferred to a floating diffusion 156 via a transfer gate 154. In one aspect, the accumulated charges at node PD may be coupled to the floating diffusion 156 generating a voltage. In one example where the accumulated charges are electrons, the floating diffusion 156 may be an N-type diffusion that is floating (i.e., not directly tied to any voltage potential). The transfer gate 154 may be a metal-oxide-semiconductor field-effect transistor (MOSFET) device controlled by a TG control signal. For example, the TG control signal may be connected to the gate of the transfer gate 154.

The voltage on the floating diffusion 156 may be coupled to an output line 160 via a MOSFET 158 and a MOSFET 172. In example, the MOSFET 158 may be connected to voltage potential VDDPIX and may perform the buffer function on the voltage of the floating diffusion 156. The MOSFET 172 may selectively provide the output of the MOSFET 158 to the output line 160. In one aspect, the MOSFET 172 may be controlled by a SEL signal, and the SEL signal may correspond to a row activation of the pixel array. The reset circuit 170 may reset the voltage on the floating diffusion 156 by, e.g., supplying VDDPIX to the floating diffusion 156.

In one implementation, a MOSFET 180 may perform the shutter function by, e.g., controlling the integration time of the pixel 150. In one example, the integration time is controlled by the MOSFET 180 resetting the voltage on the node PD (which may be, e.g., a node in the photodiode 152) according to predetermined timing. Such predetermined timing may correspond to the integration time. In one example, the MOSFET 180 may be part of a global shutter function. I.e., all pixels in an array may be controlled by the same shutter timing. In one example, the resetting may include the MOSFET 180 functioning as a supply circuit supplying, in a first charge holding capacity, a reset voltage to the node PD. The supply voltages to the drain of MOSFET 180 and/or 170 may be different from MOSFET 158. A control signal, shutter control 182, may be supplied to the gate of the MOSFET 180 to control the drain capacity of the MOSFET 180. In one aspect, the control signal (shutter control 182) may operate at a high voltage level, GSG_high, to enable the MOSFET 180 to drain the electrons from the photodiode 152, at a first capacity. In another aspect, the control signal (shutter control 182) may be at a low voltage level, GSG_low, to turn the MOSFET 180 off and not draining any electrons from the photodiode 152.

Figure 2:
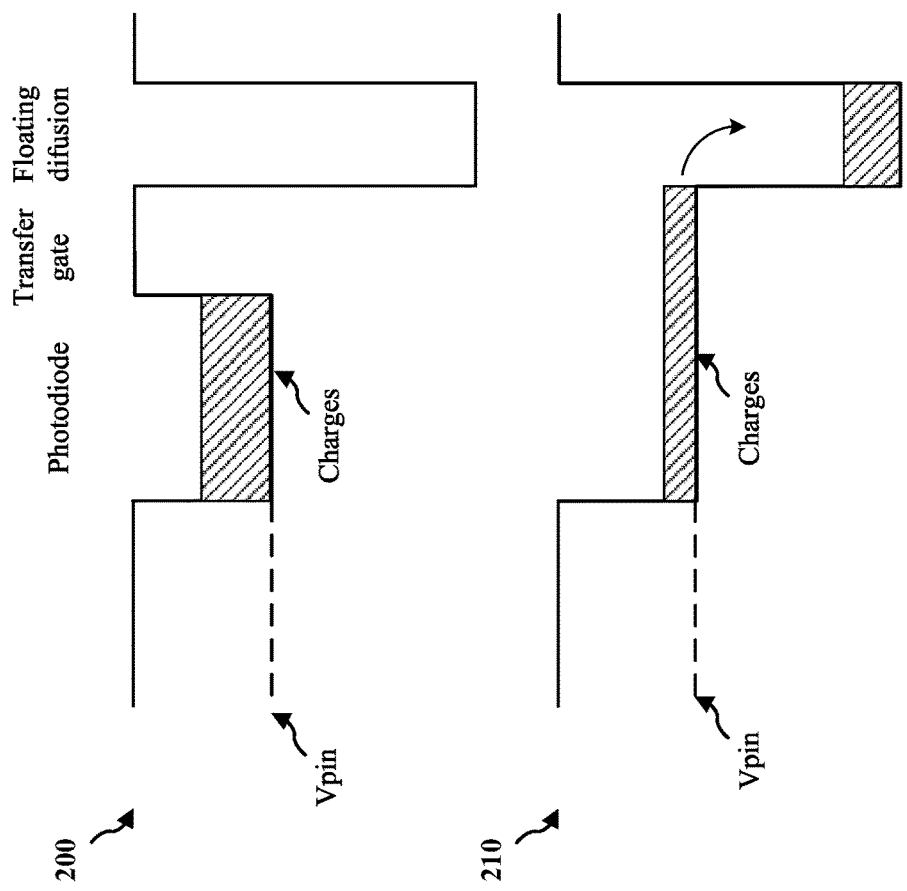
FIG. 2 is a diagram illustrating potential diagram of a pixel.

FIG. 2 is a diagram illustrating potential diagram of the pixel. The potential diagram 200 illustrates a state of charge integration before the transfer gate 154 is activated. As illustrated, the electrons are accumulated in the photodiode 152. The potential diagram 210 illustrates a state of charge transfer to the floating diffusion 156. In one aspect, the transfer gate 154 control signal (TG control signal) may go high to activate the transfer gate 154. The electrons accumulated in the photodiode 152 may flow to the floating diffusion 156 when the transfer gate 154 is activated.

As described above, the output line 160 may be inputted to an output circuit, which may include an operational amplifier (OA) amplifying the value on the output line 160. An OA generates an output voltage of a finite slope. When a large step-input voltage is applied to an OA input, or the input voltage times the OA gain exceeds the output range of the OA, the output voltage may be delayed. In the case, the OA is overloaded, the delay is known as the overload recovery time. This recovery time may last several micro seconds, which in a video system results in a tail behind a highlight area (e.g., a bright area on the image). The effect is known as streaking. In an image sensor, the overload condition is likely to be present since the highlight areas and darker areas may occur in a same scene. Generally, streaking is a disturbance in the videos black level due a highlight in the image. The value of the streaking may depend on the size and level of the highlight. In one aspect, the pixel with a photodiode limiter may address the streaking issue.

Figure 3:
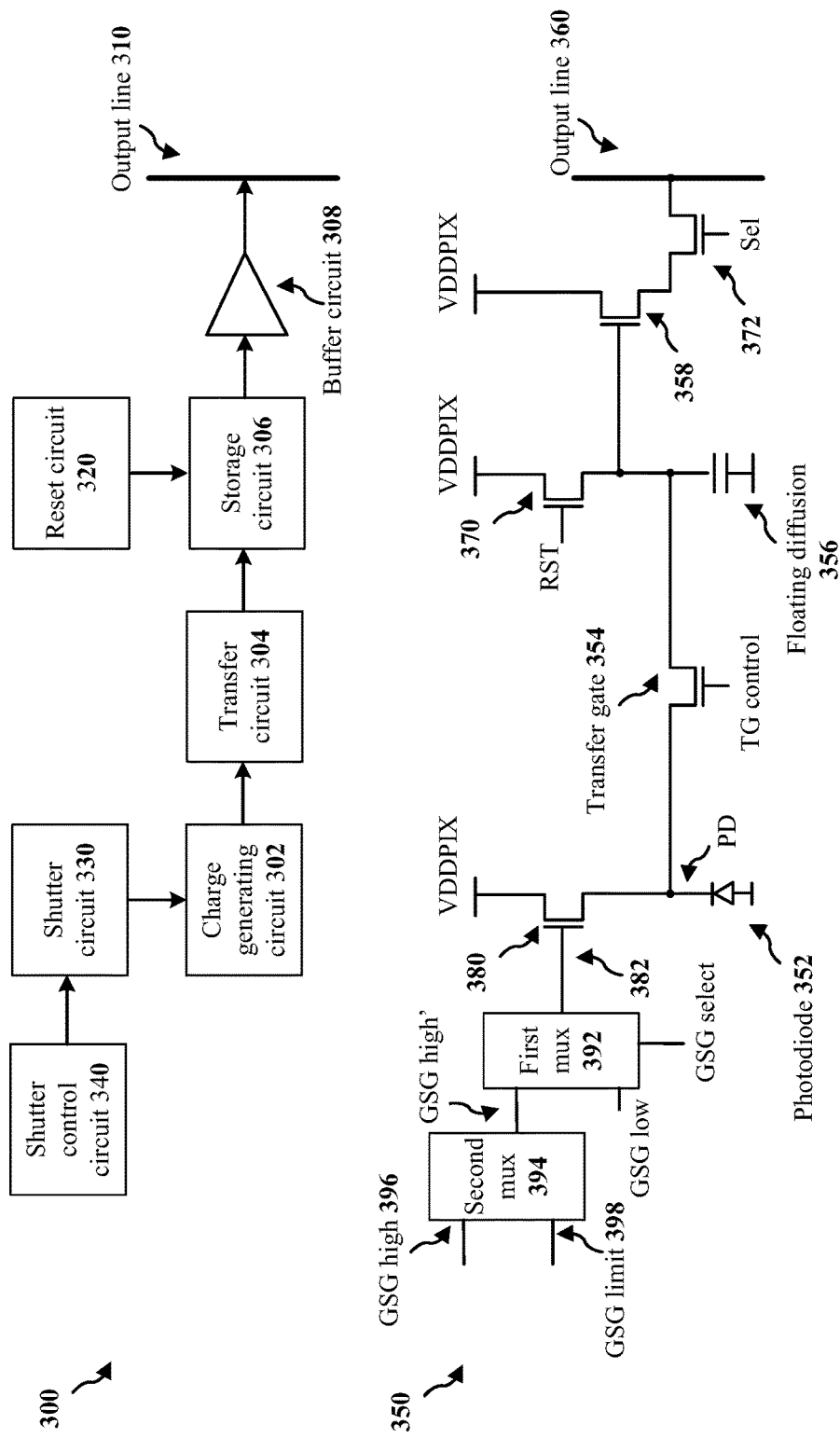
FIG. 3 is a diagram illustrating an example of a pixel with electronic shutter and photodiode limiter.

FIG. 3 is a diagram illustrating an example of a pixel with electronic shutter and photodiode limiter. In addition to the features described with the pixel of FIG. 2 (100, 150), the pixel 300 includes a shutter control circuit 340. The shutter circuit 330 may operate in an additional mode of supplying voltage to the charge generating circuit 302 with a second charge holding capacity. In one aspect, supplying voltage to the charge generating circuit 302 in the first charge holding capacity (i.e., supplying the reset voltage) may differ from the second charge holding capacity in terms of, e.g., the voltages or currents supplied.

Pixel 350 is another view of the pixel. In addition to the features of pixel 150, pixel 350 includes shutter control circuit, e.g., the first multiplexer 392 and a second multiplexer 394. In one aspect, the first multiplexer 392 may be part of the pixel 350, and the second multiplexer 394 may not be part of the pixel 350. In other words, the second multiplexer 394 may be used for a plurality of pixels 350. In another aspect the first multiplexer 392 and the second multiplexer 394 are located outside the pixel and at the beginning of a row.

In one aspect, the shutter control circuit (e.g., the first multiplexer 392 and the second multiplexer 394) controls the MOSFET 380 to supply voltage to the photodiode 352 for a second charge holding capacity. In one aspect, the MOSFET 380 drains the charge in the photodiode 352 to a first charge holding capacity at one time, and discharges the photodiode 352 to a second charge holding capacity at a second time. The second charge holding capacity may differ from the first charge holding capacity (i.e., supplying the reset voltage) in terms of, e.g., the voltages or currents supplied.

In another aspect, the MOSFET 380 is configured to keep the voltage at node PD at or above the threshold level. In one aspect, keeping the voltage at node PD at the threshold may address the streaking issue. For example, such mode may limit the voltage swing on the output line and may prevent overloading the OA in the output circuit. In another aspect, keeping the voltage at node PD at the threshold may prevent the transfer gate 354 from turning on erroneously. For example, when enough electrons are accumulated at node PD, the voltage at node PD may drop to a level such that the $V_{GS}$ voltage of the transfer gate 354 (between the gate and the node PD) is sufficient to turn on the transfer gate 354. The accumulated charges may be lost when transferred to the floating diffusion 356, generating errors and/or artifacts on the image. In one aspect, the errors and/or artifacts on the image may be prevented by the photodiode limiter.

An implementation of photodiode limiter is described supra. In one aspect, the gate 382 of the MOSFET 380 may be supplied with GSG_high level. In this case, the MOSFET 380 may supply the reset voltage to the photodiode 352 as operating in the first charge holding capacity. In another aspect, the gate of the MOSFET 380 may be supplied with GSG_limit level. The GSG_limit level may be an intermediate level below the GSG_high level. In this case, the MOSFET 380 may supply a limited voltage or charge to the photodiode 352 as operating in the second charge holding capacity. In one aspect, the voltage or charge supplied to the photodiode 352 in the second charge holding capacity may limit the voltage on the photodiode to a threshold level in the integration period.

In one implementation, the GSG_limit level may be supplied by a first multiplexer 392 and a second multiplexer 394. In one aspect, the second multiplexer 394 may not be part of the pixel array. The second multiplexer 394 may select one of the GSG_high level and the GSG_limit level, and may provide the selected level to the first multiplexer 392 as an input voltage GSG_high' thereof. In another aspect, the second multiplexer 394 may select one of the GSG_high level and a plurality of GSG_limit levels. The image sensor may include control circuits that select one of the GSG_high level and the plurality of GSG_limit levels to be supplied to the first multiplexer 392.

In one aspect, the first multiplexer 392 may select among the GSG_high' (e.g., one of the GSG_high level and the plurality of GSG_limit levels) and the GSG_low level, and supply the selected level to the gate 382 of the MOSFET 380. In one aspect, the GSG_low level may turn off the MOSFET 380, and the MOSFET 380 may not supply charges or voltage to the photodiode 352.

In one implementation, the inputs of the first multiplexer 392 may be selected by the control signal GSG select. In one case, the control signal GSG select may activate to select the GSG_high' (e.g., one of the GSG_high level and the plurality of GSG_limit levels). Accordingly, the GSG select may activate for a case that the second multiplexer 394 selects the GSG_high level and a case that that the second multiplexer 394 selects one of the plurality of GSG_limit levels.

Although the MOSFETs 380, 370, and 358 are illustrated as being connected to a supply voltage VDDPIX in this example, this needs not be the case. Each of the MOSFETs 380, 370, and 350 may be connected to a different supply voltage, as determined by the design requirements.

Figure 4:
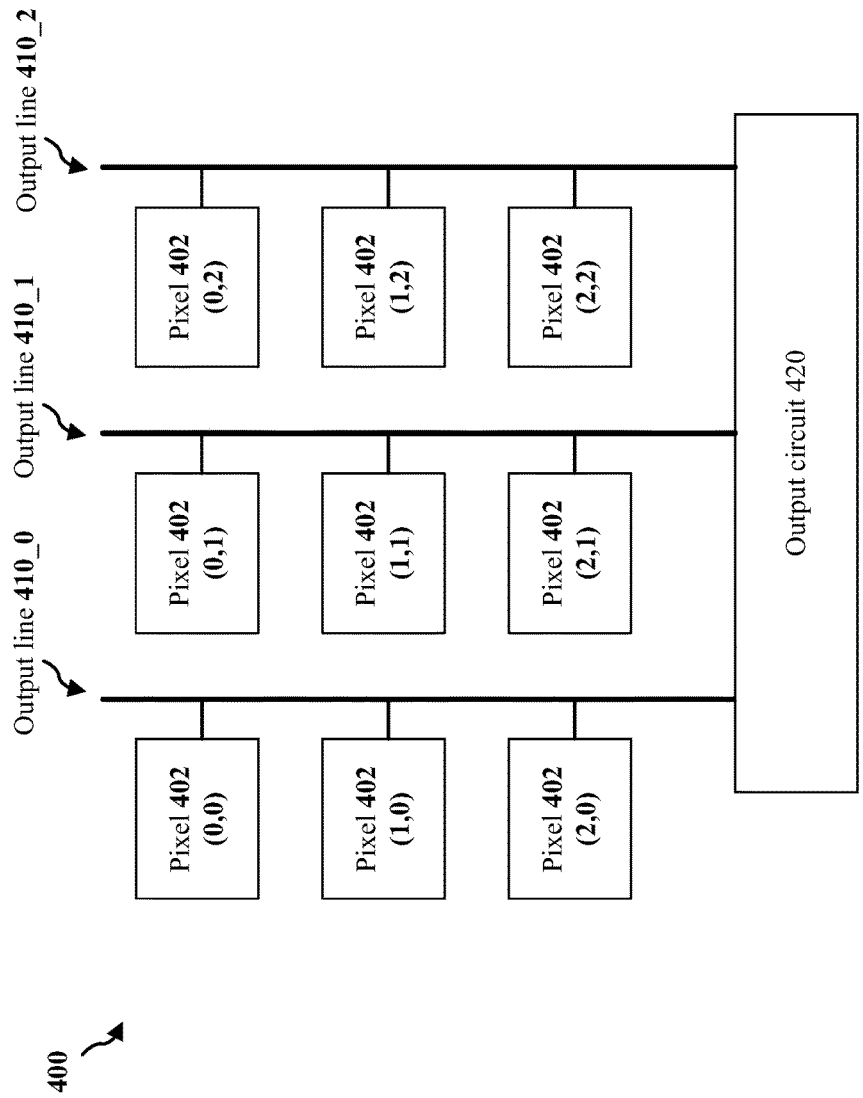
FIG. 4 is a diagram illustrating an array of pixels.

FIG. 4 is a diagram illustrating an array of three rows by three columns of pixels 402. In one aspect, each row may be activated in turn to couple the voltage of the photodiode 352 (e.g., as described above, via transfer gate 354, a floating diffusion 356, and a MOSFET 358 (buffer)) onto the output or column lines 410. For example, a row of pixels 402 (0,0), 402 (0,1), and 402 (0, 2) may be activated first. The pixel 402 (0,0) may couple the voltage on the photodiode 352 onto the output line 410_0. The pixel 402 (0,1) may couple the voltage on the photodiode 352 onto the output line 410_1. The pixel 402 (0,2) may couple the voltage on the photodiode 352 onto the output line 410_2. In one implementation, the values on the output lines 410_0, 410_1, and 410_2 may be read out sequentially by the output circuit 420. For example, the output circuit 420 may include an OA amplifying the values of the output lines 410_0, 410_1, and 410_2. In a subsequent cycle, the row of pixels 402 (1,0), 402 (1,1), and 402 (1, 2) may be activated next, and so forth.

Figure 5:
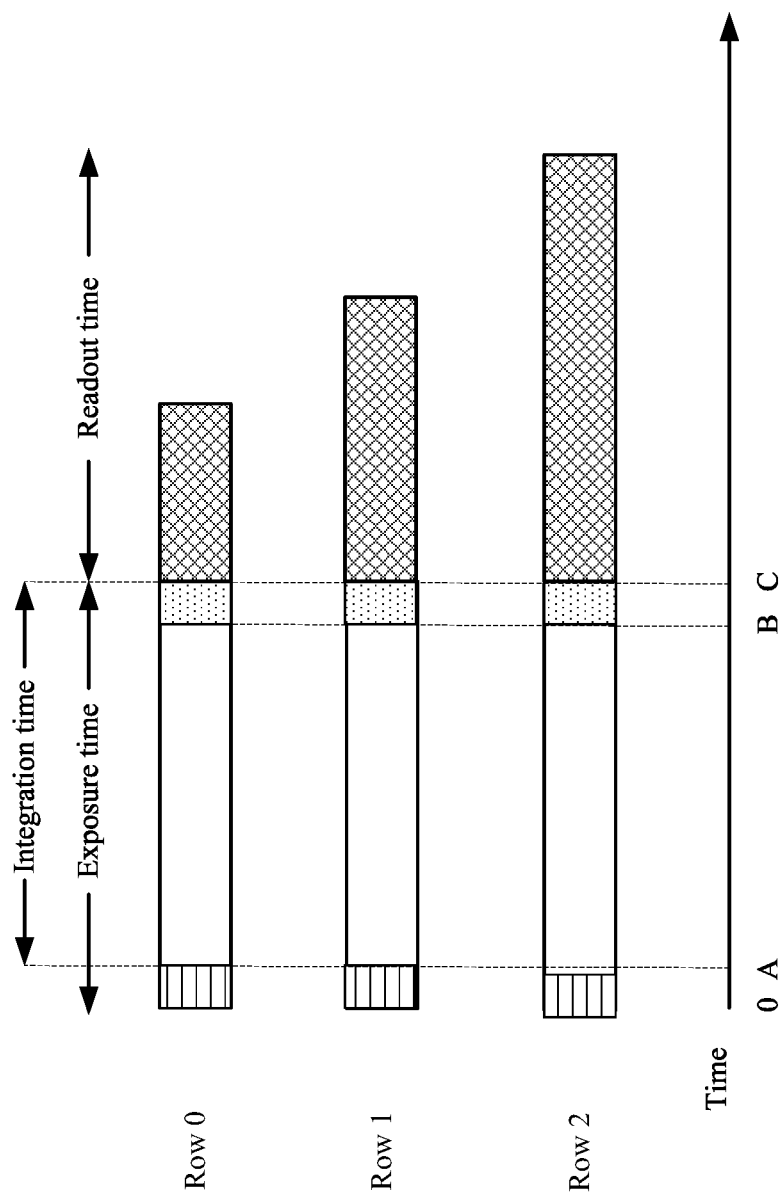
FIG. 5 is a diagram illustrating the timing diagram for an operation of a pixel.

FIG. 5 is a diagram illustrating the timing diagram for an operation of a pixel. At time 0-A, the photodiode is reset. For example, the MOSFET 380 (the shutter or voltage supply circuit) may operated in the first charge holding capacity and supply voltage to the photodiode 352, which pins the voltage of the photodiode 352 at a reset voltage $V_{pin}$. At time A-C, the integration time, the electrons may accumulate or integrate at node PD. At time B-C, the transfer gate 354 may activate to couple the voltage at node PD onto the floating diffusion 356. The time after time C may constitute data readout time. In a case that the rows are readout sequentially, the readout time may differ for the rows, as illustrated in the figure. In one aspect, the integration operation and the readout operation may be pipelined. For example, the next integration time for a row may start at time C, when the data of the previous integration is being read out.

Figure 6:
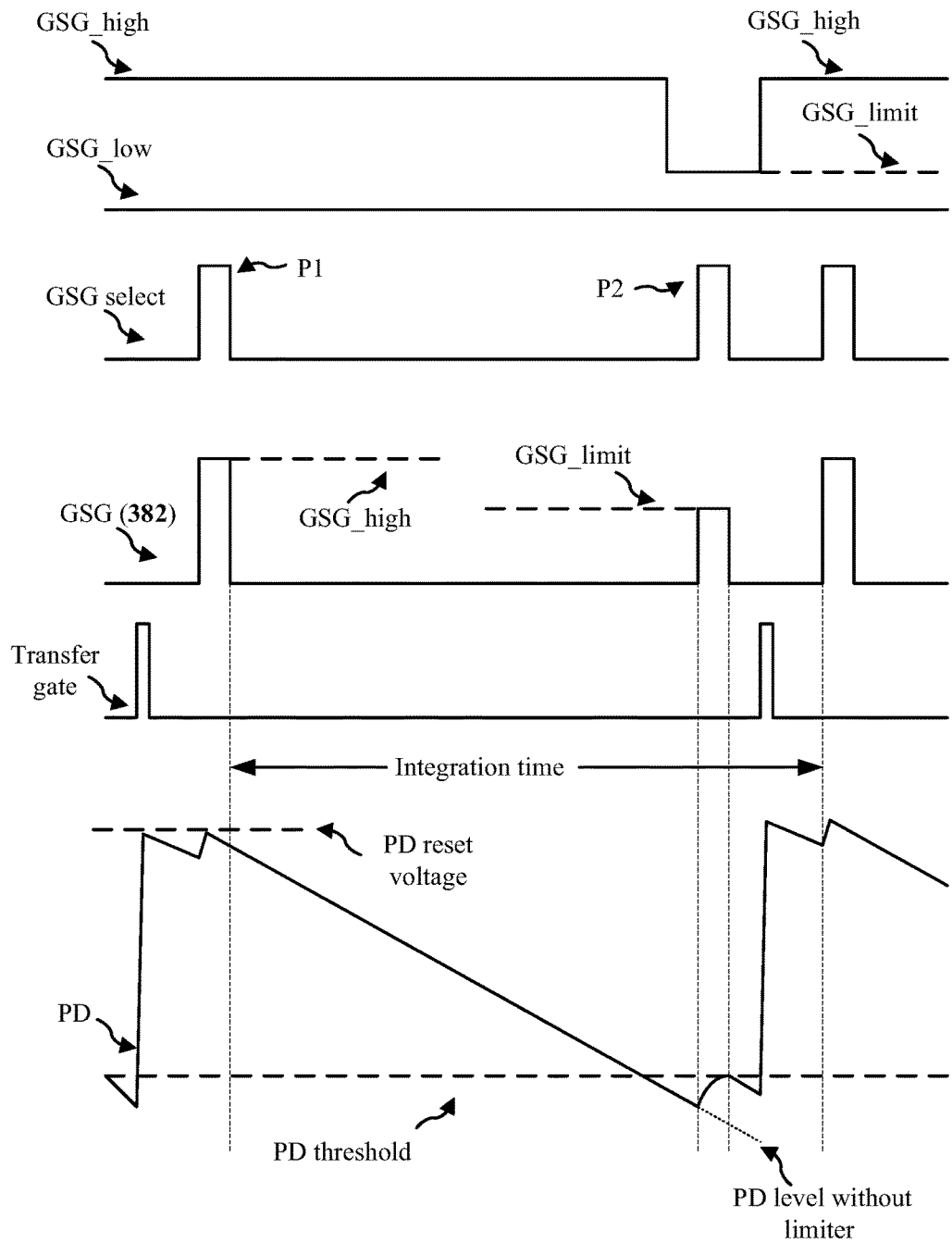
FIG. 6 is a diagram illustrating voltages for an operation of a pixel.

FIG. 6 is a diagram illustrating voltages for an operation of a pixel. FIG. 6 illustrates that the GSG_high' may be the GSG_high or the GSG_limit level. The GSG_high' level may be selected by the second multiplexer 394. At P1, the control signal GSG select of the first multiplexer 392 activates to select the GSG_high level as the gate 382 voltage for the MOSFET 380. Accordingly, the MOSFET 380 functions as a shutter circuit in setting the photodiode 352 voltage to the reset voltage $V_{pin}$. In this mode, the MOSFET 380 may also function as a supply circuit that supplies, in a first charge holding capacity, the reset voltage to the voltage of the photodiode 352.

When the control signal GSG select of the first multiplexer 392 de-activates, the GSG_low level is placed on the gate 382 of the MOSFET 380. In this mode, the MOSFET 380 does not drain electrons from the photodiode 352. In one aspect, the integration time is the period between the activations of the control signal GSG select of the first multiplexer 392. In the integration time, electrons may accumulate at the node PD. Accordingly, the voltage on the node PD decreases from $V_{pin}$ to the PD threshold. Without the photodiode limited, the voltage on the PD node may continue to decrease beyond the PD threshold. The PD level exceeding the threshold may cause the OA overload or erroneously turn on the transfer gate 354 (spilling electrons from the photodiode to the floating diffusion).

With the photodiode limiter, at P2, the control signal GSG select of the first multiplexer 392 activates to select the GSG_limit level as the gate 382 voltage for the MOSFET 380. In this mode, the MOSFET 380 may function as a supply circuit that may supply, in a second charge holding capacity, voltage or charges to the voltage of the photodiode 352. The second charge holding capacity may differ from the first charge holding capacity in terms of, e.g., the gate voltage applied to the MOSFET 380 or the charges or voltage supplied by the MOSFET 380. The MOSFET 380 supplies charges or voltage in the second charge holding capacity and maintains the voltage at node PD at the PD threshold level. In a case that the voltage at node PD is not sufficiently low, the MOSFET 380 may not turn on. In this case, the voltage difference between the gate 382 of the MOSFET 380 and the voltage on the node PD may not be big enough to turn on the MOSFET 380.

Subsequent to P2, the transfer gate 354 may turn on and transfer the electrons from the photodiode 352 onto the output line (e.g., via transfer gate 354, a floating diffusion 356, and a MOSFET 358 (buffer)). Because the charges on the photodiode PD are limited to the threshold level, the overload condition may be prevented.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An image sensor comprising:
    at least one pixel including:
        a photodiode that generates electrons in response to light detected during an integration time,
        a storage circuit that, in response to the electrons, generates an output voltage that is applied to an output line, and
        a transfer circuit that transfers the electrons from the photodiode to the storage circuit upon activation of the transfer circuit;
    a shutter circuit configured to control the integration time of the photodiode; and
    a shutter control circuit coupled to the shutter circuit and configured to maintain a node voltage between the photodiode and the shutter circuit at or above a threshold voltage to prevent overload of the output voltage and erroneous activation of the transfer circuit,
    wherein the shutter control circuit controls the shutter circuit to apply a pulsed voltage during the integration time of the photodiode to maintain the node voltage at or above the threshold voltage and control a limiting level of a voltage differential between a supply voltage and the node voltage during the integration time.

2. The image sensor according to claim 1, wherein the shutter circuit is a transistor connecting the photodiode of the at least one pixel to the supply voltage and that limits the voltage differential between the supply voltage and the node voltage during the integration time.

3. The image sensor according to claim 2, wherein the shutter control circuit is coupled to a gate of the transistor and configured to apply a first voltage to the gate to reset the node voltage and a subsequent second voltage to the gate to set the threshold voltage as the second voltage, wherein the second voltage is lower than the first voltage.

4. The image sensor according to claim 3, wherein a transfer gate is activated after the shutter control circuit applies the second voltage to transfer the electrons from the photodiode to the storage circuit.

5. The image sensor according to claim 3, wherein the shutter control circuit comprises:
    a first multiplexor having a pair of inputs receiving the first and second voltages, respectively;
    a second multiplexor having a pair of inputs respectively coupled to an output of the first multiplexor and a third voltage lower than the second voltage that turns off the transistor; and
    a control circuit configured to control the first and second multiplexors to select one of the first, second and third voltages to be applied to the gate of the transistor.

6. An image sensor comprising:
    a charge generating circuit that generates a charge in response to light detected during an integration time and a transfer circuit that transfers the charge to a storage circuit that generates an output voltage;
    a shutter circuit configured to control the integration time of the charge generating circuit; and
    a shutter control circuit coupled to the shutter circuit and configured to set a voltage threshold of the charge generating circuit during the integration time of the charge generating circuit to prevent overload of the output voltage,
    wherein the shutter control circuit is configured to control the shutter circuit to apply a pulsed voltage during the integration time of the charge generating circuit to set the voltage threshold and control a limiting level of a voltage differential between a supply voltage and a voltage of the charge generating circuit during the integration time.

7. The image sensor according to claim 6, wherein the voltage threshold is set by the shutter control circuit to prevent erroneous activation of the transfer circuit.

8. The image sensor according to claim 6, wherein the shutter circuit is a transistor connecting the charge generating circuit to a supply voltage and that limits a voltage differential between the supply voltage and a voltage of the charge generating circuit during the integration time.

9. The image sensor according to claim 8, wherein the shutter control circuit applies a first voltage to a gate of the transistor to reset a voltage of the charge generating circuit and subsequently a second voltage to the gate to set the voltage threshold as the second voltage lower than the first voltage.

10. The image sensor according to claim 9, wherein a transfer gate is activated after the shutter control circuit applies the second voltage to transfer the charge from the charge generating circuit to the storage circuit.

11. An image sensor comprising:
    at least one pixel including a photodiode that generates electrons in response to light detected during an integration time; and
    a photodiode limiter configured to control the integration time of the photodiode and maintain a node voltage of the photodiode at or above a threshold voltage during the integration time to prevent overload of an output voltage of the image sensor, wherein the photodiode limiter is configured to apply a pulsed voltage during the integration time to set the threshold voltage and control a limiting level of a voltage differential between a supply voltage and the node voltage during the integration time.

12. The image sensor according to claim 11, wherein the photodiode limiter includes a transistor connecting the photodiode of the at least one pixel to a supply voltage and that limits a voltage differential between the supply voltage and the node voltage during the integration time.

13. The image sensor according to claim 12, wherein the photodiode limiter includes a shutter control circuit that is coupled to a gate of the transistor and configured to apply a first voltage to the gate to reset the node voltage and a subsequent second voltage to the gate to set the threshold voltage as the second voltage, wherein the second voltage is lower than the first voltage.

14. The image sensor according to claim 13, wherein a transfer gate is activated after the shutter control circuit applies the second voltage to transfer the electrons from the photodiode to a storage circuit.

15. The image sensor according to claim 13, wherein the shutter control circuit comprises:
    a first multiplexor having a pair of inputs receiving to the first and second voltages, respectively;
    a second multiplexor having a pair of inputs coupled to an output of the first multiplexor and a third voltage lower than the second voltage that turns off the transistor; and
    a control circuit configured to control the first and second multiplexors to select one of the first, second and third voltages to be applied to the gate of the transistor.

16. An image sensor comprising:
    at least one pixel including a photodiode that generates a charge in response to light and a transfer circuit that transfers the charge to a storage circuit to generate an output voltage for an image; and
    a photodiode limiter configured to maintain a photodiode voltage while the photodiode is generating the charge at or above a threshold voltage set to prevent at least one of overload of the output voltage and erroneous activation of the transfer circuit,
    wherein the photodiode limiter is configured to apply a pulsed voltage during an integration time to set the voltage threshold and control a limiting level of a voltage differential between a supply voltage and the photodiode voltage during the integration time.

17. The image sensor according to claim 16, further comprising a transistor connecting the photodiode of the at least one pixel to a supply voltage and that limits a voltage differential between the supply voltage and the photodiode voltage during integration of the photodiode.

18. The image sensor according to claim 17, wherein the photodiode limiter is coupled to a gate of the transistor and configured to apply a first voltage to the gate to reset the photodiode voltage and a subsequent second voltage to the gate to set the threshold voltage as the second voltage, wherein the second voltage is lower than the first voltage.

19. The image sensor according to claim 18, wherein the photodiode limiter comprises:
    a first multiplexor having a pair of inputs receiving the first and second voltages, respectively;
    a second multiplexor having a pair of inputs coupled to an output of the first multiplexor and a third voltage lower than the second voltage that turns off the transistor; and
    a control circuit configured to control the first and second multiplexors to select one of the first, second and third voltages to be applied to the gate of the transistor.

20. A method for operating an image sensor including a pixel having a photodiode that generates a charge in response to light and a transfer circuit that transfers the charge to a storage circuit to generate an output voltage for the image, the method comprising:
    applying a first voltage level to a shutter circuit coupled to the pixel to reset a photodiode voltage of the photodiode;
    applying a second voltage level to the shutter circuit while the photodiode is generating the charge to maintain the photodiode voltage at a threshold voltage to prevent at least one of overload of the output voltage and erroneous activation of the transfer circuit; and
    applying the second voltage level to the shutter circuit as a pulsed voltage while the photodiode is generating the charge to set the voltage threshold and control a limiting level of a voltage differential between a supply voltage and the output voltage during an integration time.

21. The method according to claim 20, further comprising limiting, by the shutter circuit, a voltage differential between a supply voltage and the photodiode voltage during integration of the photodiode.

22. The method according to claim 20, further comprising:
    applying a first voltage to the shutter circuit to reset the photodiode voltage; and
    applying a subsequent second voltage to the shutter circuit to set the threshold voltage as the second voltage, wherein the second voltage is lower than the first voltage.

* * * * *